United States Patent [19]
O'Keefe

[11] Patent Number: 5,664,995
[45] Date of Patent: Sep. 9, 1997

[54] ENVIRONMENTAL ENCLOSURE APPARATUS WITH AIR FLOW CONTROL AND BALANCING

[75] Inventor: Kevin Michael O'Keefe, Troy, N.Y.

[73] Assignee: O.K. Filters Company, Inc., Troy, N.Y.

[21] Appl. No.: 669,878

[22] Filed: Jun. 21, 1996

[51] Int. Cl.$^6$ .................... F24F 3/16; B08B 15/02
[52] U.S. Cl. .................... 454/58; 454/60; 454/187
[58] Field of Search .................... 454/52, 56, 57, 454/58, 60, 187, 255

[56] References Cited

U.S. PATENT DOCUMENTS

| | | |
|---|---|---|
| 2,810,337 | 1/1957 | Samuelson et al. |
| 2,885,947 | 3/1959 | Brown. |
| 3,336,855 | 8/1967 | Messina. |
| 4,399,741 | 8/1983 | Zboralski. |
| 4,466,341 | 8/1984 | Grogan. |
| 4,497,242 | 2/1985 | Moyer. |
| 4,723,480 | 2/1988 | Yagi .................... 454/57 |
| 4,741,257 | 5/1988 | Wiggin et al. |
| 4,987,673 | 1/1991 | Kogura et al. .................... 29/564 |
| 5,090,304 | 2/1992 | Egbers et al. .................... 454/59 |
| 5,095,811 | 3/1992 | Shutic et al. .................... 454/52 |
| 5,195,922 | 3/1993 | Genco .................... 454/57 |
| 5,295,902 | 3/1994 | Hock .................... 454/57 |
| 5,356,335 | 10/1994 | Matsui et al. .................... 454/52 |
| 5,415,583 | 5/1995 | Brandt, Jr. .................... 454/61 |

FOREIGN PATENT DOCUMENTS

| | | | |
|---|---|---|---|
| 63-135737 | 6/1988 | Japan .................... | 454/187 |
| 3-263534 | 11/1991 | Japan .................... | 454/187 |
| 5-60356 | 3/1993 | Japan .................... | 454/187 |
| 6-101880 | 4/1994 | Japan .................... | 454/187 |
| 6-193949 | 7/1994 | Japan .................... | 454/255 |

*Primary Examiner*—Harold Joyce
*Attorney, Agent, or Firm*—Heslin & Rothenberg P.C.

[57] ABSTRACT

An environmental enclosure apparatus is presented with air flow control and air balancing. The apparatus includes a housing having a work chamber, multiple adjustable fans for moving air into the work chamber, a filter for filtering particulate from the air moving into the chamber and a control mechanism for controlling each of the multiple adjustable fans. The control mechanism is responsive to a sensor which determines a change in position of at least one component within the work chamber. The at least one component could comprise a work product, a work tool or other product handling device. Air balancing is achieved through the provision of multiple chases within the enclosure, some of which have inlets at a bottom of the enclosure for drawing in external air and some of which have openings internal to the work chamber adjacent to a work surface for facilitating air flow balancing. Preferably, at least some of the chases have controllable dampers and/or controllable draw means coupled to the control mechanism for further facilitating of automatic air flow balancing within the work chamber.

48 Claims, 9 Drawing Sheets

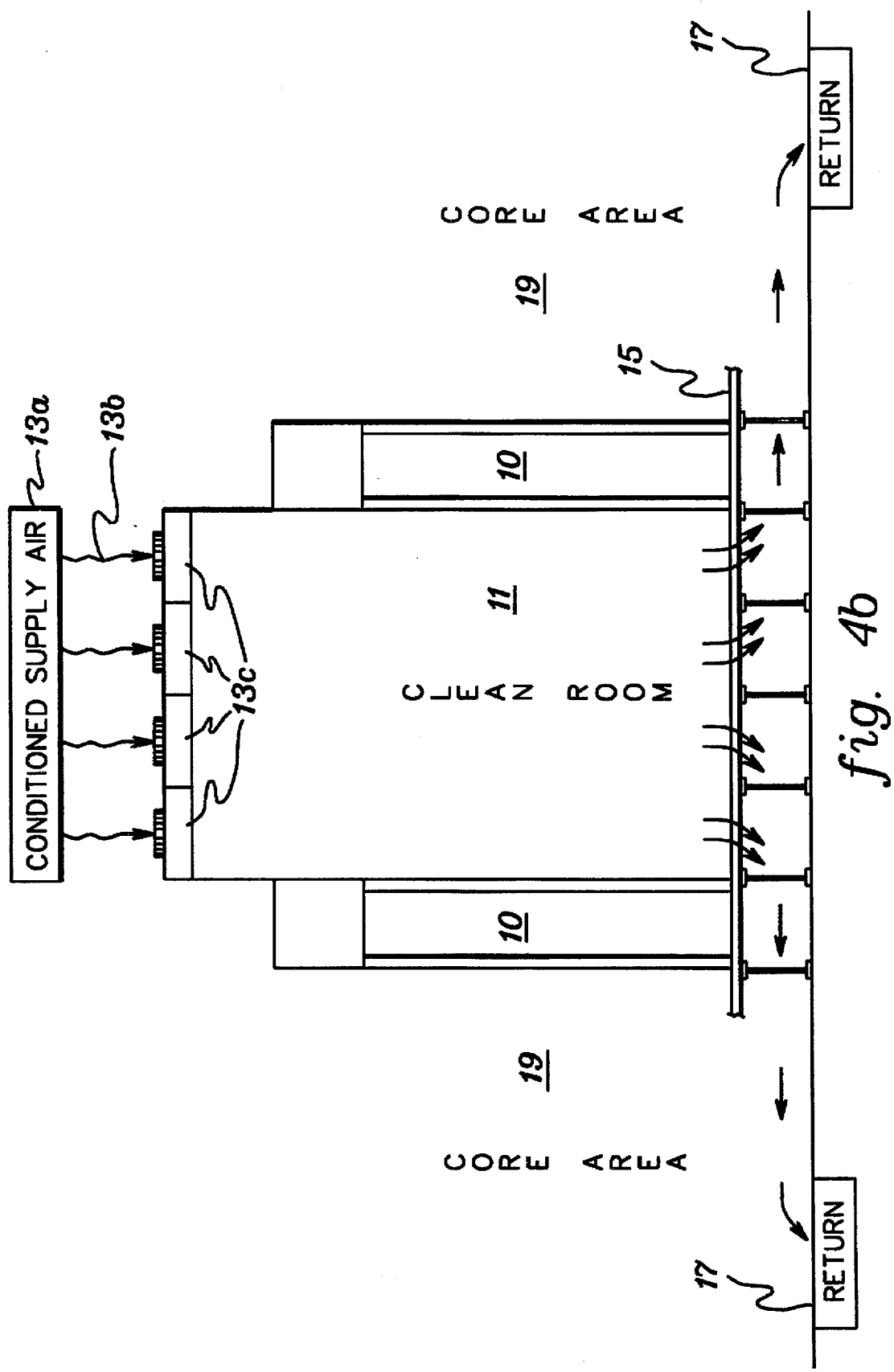

5,664,995

ENVIRONMENTAL ENCLOSURE APPARATUS WITH AIR FLOW CONTROL AND BALANCING

TECHNICAL FIELD

This invention relates in general to environmental control systems, and more particularly, to an environmental enclosure apparatus which provides air flow control and balancing to efficiently establish a class M1 clean area within the enclosure.

BACKGROUND ART

As is well known, fabricating semiconductor chips is a multi-step process. Briefly explained, silicon wafers, sliced from a crystal ingot, initially are lapped flat and polished to a mirror-like finish. A layer of single crystalline silicon is subsequently grown on each wafer and the wafers are oxidized at elevated temperatures approaching 1000° C. A light-sensitive "photo-resist" coating may then be applied to each wafer and a wafer stepper used to expose the photo-resist coating. Exposing the coating produces multiple prints containing images of several integrated circuit chips on each wafer.

Following exposure, the photo-resist coatings are developed and baked to harden the patterned prints onto the silicon wafers. The wafers then contact a reactive gas discharge, etching exposed portions of the wafers, before having ionized Boron atoms or other impurities implanted into the patterns. A low temperature (350° C.) plasma discharge deposits silicon dioxide on the wafers at low pressure, while circuit component contacts may be made by depositing onto the wafers a thin aluminum or similar metallic film. Each wafer layer is then cut into multiple semiconductor chips using a precision diamond saw and the chips are attached to packages having contact lead and wire connections. Finally, each chip is encapsulated in plastic for mechanical and environmental protection.

Because even microscopic airborne impurities can degrade the quality and yield of the fabricated chips, many of these manufacturing steps, including those of applying the photo-resist coating to the wafers and exposing the integrated circuit chip images on the coatings, are performed in facilities referred to as "clean rooms." The atmosphere of a clean room is generally regulated to limit the numbers and types of particles capable of contacting the silicon wafers. Humidity/ventilation/air conditioning (HVAC) equipment is used to condition the air within the clean room, in part to reduce particle concentrations resulting from other sources of contamination such as the wafer processing and handling machinery. Additionally, the bodies of workers operating in the clean room are conventionally enveloped by sterile clothing to prevent skin, hair and other personal particulate matter from being deposited on the wafers.

An average manufacturing facility may include as many as 200 pieces of processing and handling equipment for fabricating semiconductor chips. To accommodate both the various equipment used to process the wafers and the wafer-handling personnel, the size of many clean rooms frequently may approach 20,000 square foot. Such rooms are costly to construct, requiring sophisticated monitoring and air conditioning equipment to regulate, even moderately, the large-scale environments. Typically, within a clean room are placed multiple environmental control enclosures, each of which provides more rigorous decontamination standards within a work area to establish an environment within which today's chips may be fabricated. These environmental enclosures can consume a significant amount of energy since they have traditionally been designed to accomplish HVAC conditioning within the work area without accounting for the energy employed to accomplish this goal.

For example, a conventional environmental enclosure is disposed within a clean room so as to separate a clean room isle from a "core area" wherein machinery and piping resides to handle the fabrication process. The core area contains unconditioned air in terms of temperature, humidity and particles per cubic foot. The conventional environmental enclosure is designed to draw in unconditioned air from this core area, then filter and condition the air before moving the air into the work area of the environmental enclosure. To accomplish this, existing environmental enclosure apparatus can be expensive to operate, particularly since the enclosure is already disposed within a clean room.

As an alternate approach, reference the self-contained environmental enclosure system of U.S. Pat. No. 5,195,922, wherein a control system is described having a series of modules, connectable isolation chambers and associated atmospheric control equipment. This disclosure is put forth as an alternative to a traditional clean room. Although apparently achieving its goal of not requiring a clean room, such machinery is clearly complicated and expensive to operate.

Thus, there exists a need in the art for an improved environmental control apparatus which is designed with the goal of achieving enhanced energy efficiency, while still providing a work chamber that meets the necessary particulate and air conditioning requirements. The present invention addresses this need within the environment of a clean room.

DISCLOSURE OF INVENTION

Briefly summarized, the invention comprises in one aspect an environmental enclosure apparatus including a housing having a work chamber and a fan apparatus for moving gaseous fluid into the work chamber. The fan apparatus includes multiple adjustable fans. A filter is provided for filtering particulates from gaseous fluid moving into the work chamber. Further, sensing means is provided for sensing a change within the work chamber, wherein the change comprises movement of a work component within the work chamber. A control means is coupled to the sensing means and to the multiple adjustable fans for causing an automatic adjustment in at least one adjustable fan of the multiple fans in response to the sensing means sensing the change within the work chamber.

Various enhancements to the above-outlined, basic environmental enclosure apparatus in accordance with the present invention are described and claimed herein. For example, the sensing means could comprise means for sensing movement of a work product, a work tool or other material handling device within the work chamber, wherein the control means responds to said movement by automatically varying gaseous fluid flow through at least one adjustable fan of the multiple adjustable fans. With the ability to independently control gaseous fluid flow through multiple adjustable fans, an improvement in energy efficiency is obtained since higher fluid flow can be selectively provided only in the area of the work chamber necessary to maintain a desired clean room condition and particulate concentration for a given process operation.

In a further aspect, the invention comprises an environmental enclosure apparatus including a housing having a work chamber and fan apparatus for moving gaseous fluid into the work chamber. The fan apparatus includes multiple adjustable fans. A filter is provided for filtering particulates from gaseous fluid moving into the work chamber. Further, sensing means is provided for sensing a pressure differential between pressure within the work chamber and pressure external to the environmental enclosure apparatus. A control means is coupled to the sensing means and to the multiple adjustable fans for causing an automatic adjustment in at least one adjustable fan of the multiple fans in response to the sensing means sensing a change in the pressure differential between pressure within the work chamber and pressure external to the environmental enclosure apparatus.

In another aspect, an environmental enclosure apparatus is provided herein for disposition within a "conditioned space" containing conditioned gaseous fluid. This apparatus includes a stand having a work chamber and a fan apparatus for moving gaseous fluid into the work chamber. Additionally, a filter is provided for filtering particulate from the gaseous fluid moving into the work chamber. A chase supplies gaseous fluid to the fan apparatus. The chase is located within the stand and extends from a lower portion of the stand to an upper portion of the stand. An inlet to the chase is disposed at the lower portion of the stand and positioned to face outward from the stand into the conditioned space for drawing in the conditioned gaseous fluid from the conditioned space for supply to the fan apparatus.

In still another aspect, the invention comprises an environmental enclosure apparatus including a housing having a work chamber and a work surface within the work chamber. A fan apparatus is disposed to move gaseous fluid into the work chamber and a filter is provided for filtering particulate from the gaseous fluid moving into the chamber. Multiple chases are located within the housing, each with an inlet positioned within the work chamber adjacent to the work surface and an outlet at the fan apparatus. Inlets to the multiple chases are disposed within the work chamber adjacent to the work surface in locations to achieve a balance of fluid flow within the work chamber, e.g., to ensure a substantially uniform fluid flow within the work chamber.

In a further aspect, the invention comprises an environmental enclosure apparatus having a housing with a work chamber. A fan apparatus moves gaseous fluid into the work chamber and a filter removes particulate from the fluid moving into the chamber. Multiple chases are provided for supplying the gaseous fluid to the fan apparatus. The chases are disposed within the housing each with an inlet positioned to face inward to the work chamber. An adjustable draw means is associated with at least one of the chases for actively drawing gaseous fluid from the work chamber. A sensing mechanism is provided for detecting a pressure change within the work chamber and control means is coupled to both the sensing means and to the adjustable draw means in order to automatically adjust the draw means in response to sensing of a pressure change within the work chamber.

In a yet further aspect, the invention comprises an environmental enclosure apparatus with a housing having a work chamber. A fan apparatus moves gaseous fluid into the work chamber, and includes at least one adjustable fan. A filter removes particulate from the gaseous fluid moving into the work chamber. At least one chase within the housing supplies gaseous fluid to the fan apparatus. The chase includes an adjustable damper and has an inlet disposed within the work chamber. A sensing mechanism is provided for sensing gaseous fluid pressure within the work chamber and a control means is coupled to the adjustable fan, the adjustable damper and to the sensing means for balancing gaseous fluid pressure within the work chamber by automatically adjusting at least one of the adjustable fan and the adjustable damper.

Various fluid balancing and control methods are also described and claimed herein.

To restate, the environmental enclosure apparatus in accordance with the present invention achieves energy efficient air flow control, in part by employing clean room supply air which has already been conditioned. The apparatus can be used to attain or assist in air flow balancing between the clean room and the environmental enclosure apparatus, between the enclosure and a core area, between the clean room and the core area, and between adjacent enclosures. Further, the apparatus provides automatic air flow control in response to movement of a work component within the enclosure. Energy efficiency is enhanced by selectively increasing/decreasing fluid flow in target areas of the work chamber in response to a change within the work chamber, such as the existence of an undesired pressure differential between the work chamber and the ambient environment or such as movement of a work tool within the chamber.

BRIEF DESCRIPTION OF THE DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

FIG. 4b is a side elevation of a clean room having a clean room isle defined by multiple environmental enclosure apparatus in accordance with the present invention.

BEST MODE FOR CARRYING OUT THE INVENTION

Figure 1:
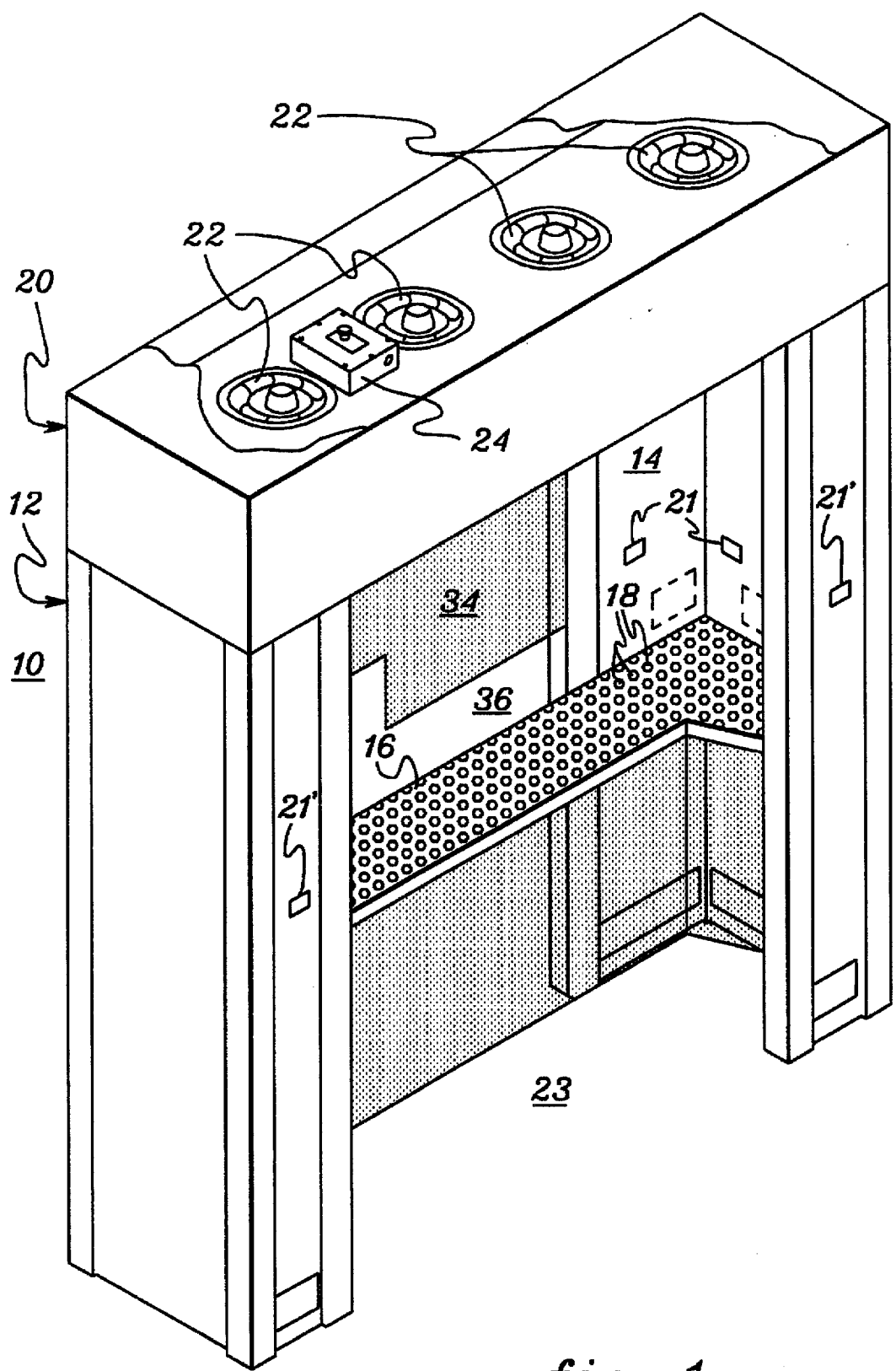
FIG. 1 is a perspective view of one embodiment of an environmental enclosure apparatus in accordance with the present invention.

FIG. 1 depicts one embodiment of an environmental enclosure apparatus, generally denoted 10, incorporating certain aspects of the present invention. Environmental enclosure apparatus 10 consists of a self-supporting stand 12 and a fan/filter assembly 20 disposed atop stand 12. A work chamber 14 is defined within apparatus 10 which is bounded by the inner walls of stand 12, a work surface 16 positioned therein and fan/filter apparatus 20. A service opening 23 is disposed in the front of stand 12 and surface 16 has a plurality of through openings 18 to allow the flow of air therethrough. The back of the work chamber is sealed by a barrier 34, such as a plastic shield, to block air within the enclosure from the ambient air. An opening 36 is defined in back panel 34 through which a work tool 82 (FIG. 8) would extend. Opening 36 is sealed by a housing 80 (FIG. 8) containing the work tool.

In the embodiment described herein, apparatus 10 is embodied as a workstation useful for fabricating semiconductor chips in a clean room environment. With such an application, the gaseous fluid provided to the work chamber will comprise air. However, those skilled in the art should note that the novel aspects of the present invention described and claimed herein can be applied to moving of any gaseous fluid into the work chamber.

FIG. 1 also depicts multiple fans 22 within fan/filter apparatus 20. Each fan is capable of moving air downward into a different area of work chamber 14. Fans 22 are assumed to comprise adjustable fans which are preferably computer controlled, for example, through control mechanism 24. Advantageously, the present invention enhances energy efficiency of environmental enclosure apparatus 10 by allowing a higher rate of air flow through selected fans of apparatus 20 in coordination with work being performed within chamber 14. For example, multiple sensors 21 could be disposed within the chamber 14 to identify a change occurring within the chamber to which it is desirable to adjust the air flow through one or more of the fans 22.

As a specific example, sensors 21 could comprise motion sensors which provide feedback to control mechanism 24 based upon a current location of a work component within chamber 14. The work component could comprise a work product, a work took or other material handling device. This is discussed further below in connection with FIG. 8. Thus, energy conservation can be achieved by reducing air flow into the chamber in those areas remote from the work being performed on the work product, or conversely, by increasing air flow into the chamber only in those areas where work is being performed, e.g., to prevent contamination by particulate originating from a work tool.

As another example, pressure sensing can be employed to maintain a positive air flow through access opening 23 of apparatus 10. In such an application, positive flow can be maintained by sensing pressure differential between pressure within chamber 14 and pressure external to the apparatus. Thus, at least one sensor 21 within chamber 14 could comprise a pressure sensor, while at least one sensor 21' facing external to apparatus 10 could comprise a pressure sensor for determining ambient pressure about the apparatus. With both measurements, a positive pressure differential is able to be maintained.

For example, with disposition of a material handling device (FIG. 8) at access opening 23 of apparatus 10, a change in air flow through the access opening might occur. This change in air flow would manifest itself as a pressure change within chamber 14 relative to the pressure of ambient air surrounding the apparatus. Thus, upon detection of a change in the pressure differential, air flow through fan/filter apparatus 20 can be quickly increased to ensure against contamination of any work product within the chamber, e.g., from a work tool or resulting from the presence of the material handling device at the access opening. This ability to change air flow into the chamber commensurate with a change occurring in the pressure differential across the access opening allows for energy conservation in that higher fan speeds can be employed only when necessary to ensure against contamination of a work product within the chamber.

Further energy efficiency is achieved via the unique air supply approach employed herein. Supply of air to fan/filter apparatus 20 in accordance with the present invention can best be understood with reference to FIGS. 2 & 3. In this embodiment, multiple chases 40a, 40b & 40c are defined between an outer wall 30 and an inner wall 32 of stand 12. Openings 44a, 44b & 44c respectively feed chases 40a, 40b & 40c. These openings are disposed in a lower portion of stand 12 so supply air 42 is drawn from near the floor of the clean room for provision to fan apparatus 20 (FIG. 3). Since air is cooler near the floor, air drawn in at the bottom of the stand will be of higher conditioned quality. In the embodiment depicted, only openings 44a face outward into the clean room environment. However, if desired, additional openings could be provided to face external to the stand, e.g., in the sidewalls of the stand.

Those skilled in the art should note that the environmental enclosure apparatus embodiment depicted herein lacks any dedicated conditioning equipment, i.e., other than appropriate Ulpa filters, to provide temperature and humidity conditioning to the air. This is because the apparatus advantageously employs air already conditioned by the clean room HVAC equipment. Again, this is in contrast to conventional approaches wherein unconditioned air is typically drawn from a core area of the clean room, thus requiring each enclosure to have HVAC equipment.

Although facing inward to the stand, openings 44b & 44c also draw in clean room air since a shield 38 is disposed so as to extend from work surface 16 downward to a distance 'h' from the floor. This distance 'h' may be varied as desired to allow for more or less conditioned air to be drawn in to the enclosure at openings 44b & 44c from the surrounding clean room.

Figure 2:
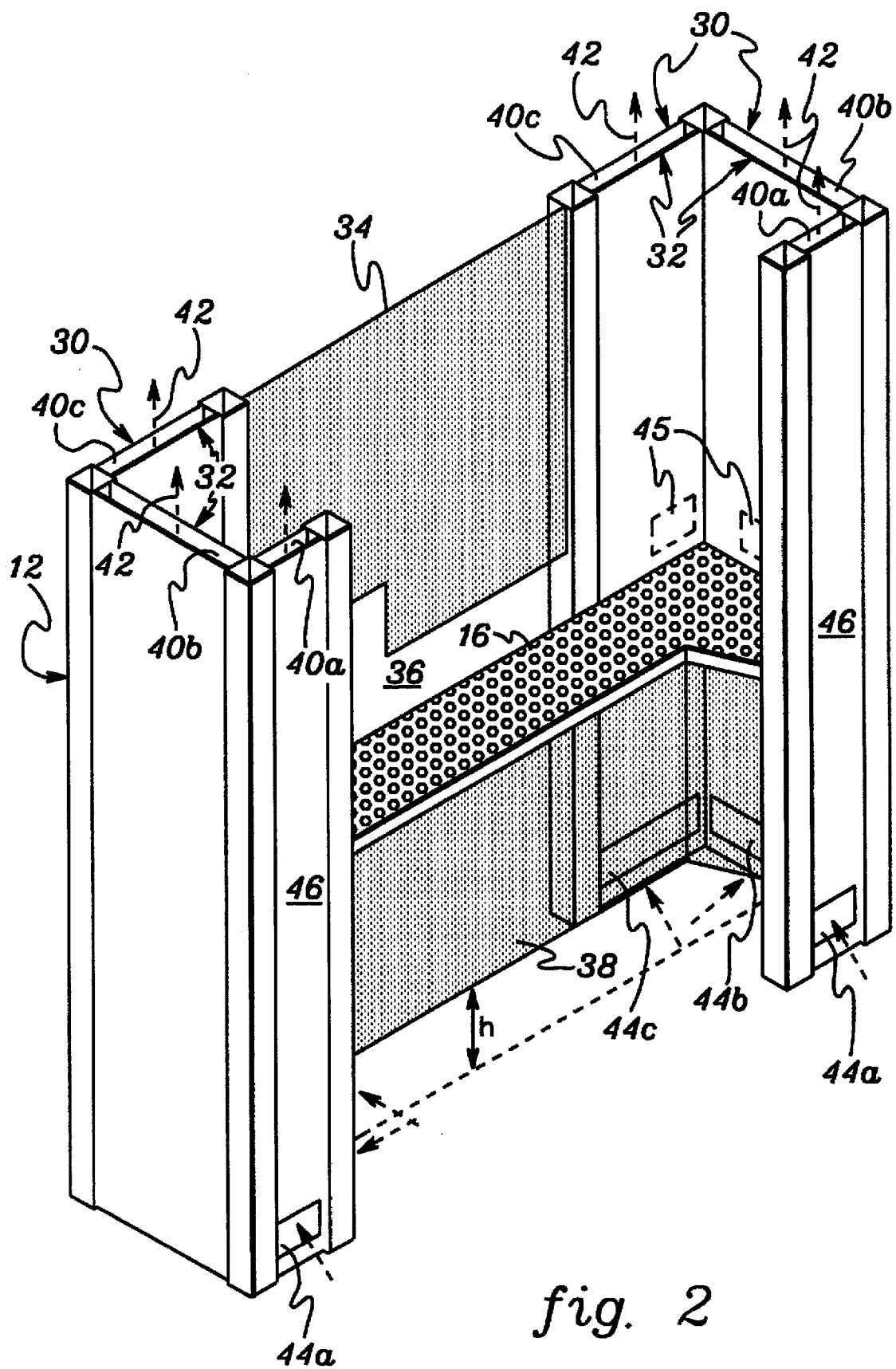
FIG. 2 is a perspective view of the stand portion of the environmental enclosure apparatus of FIG. 1.
Figure 3:
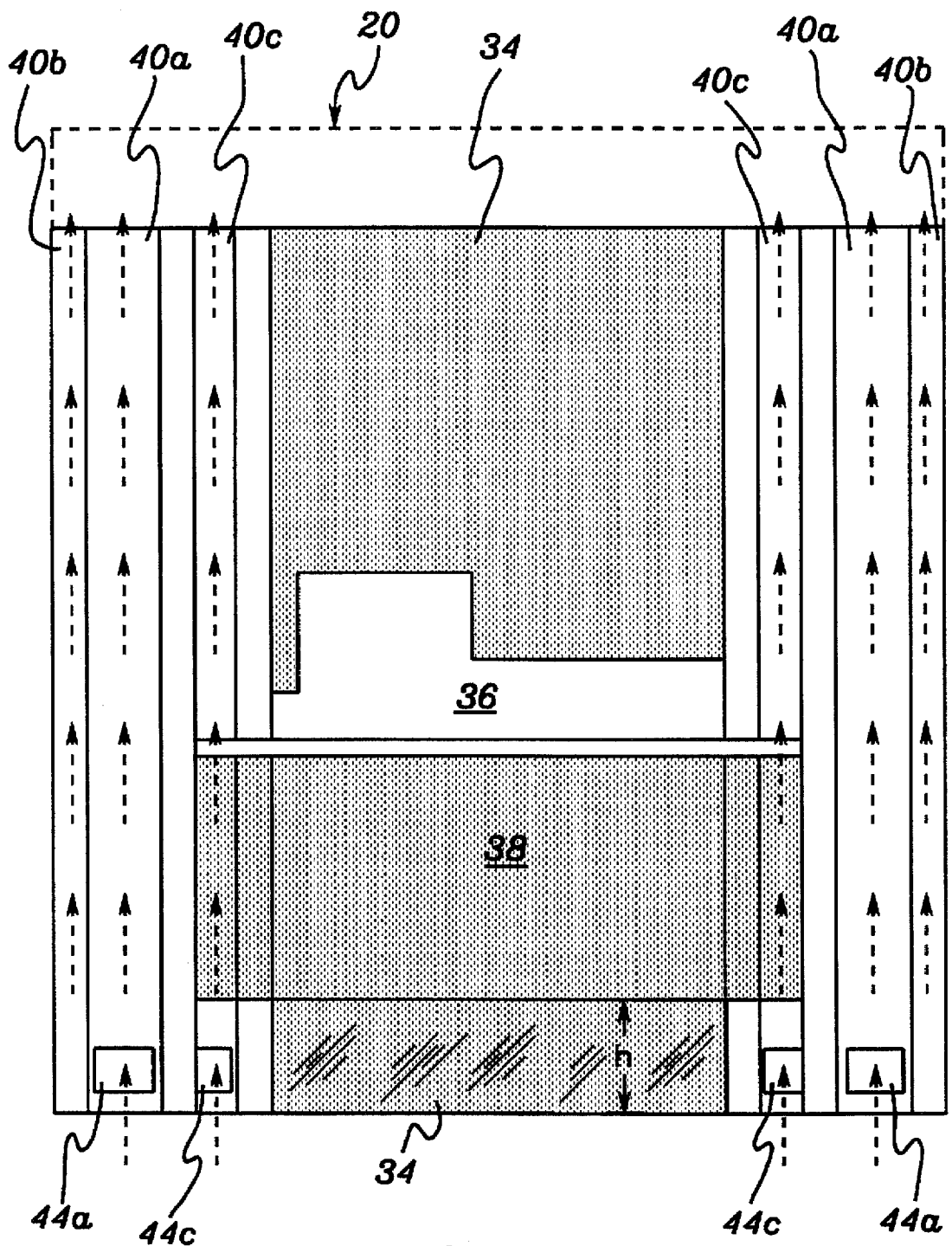
FIG. 3 is a front elevational view of the stand of FIG. 2.

Although FIGS. 2 & 3 represent one preferred embodiment of chases for supplying air to fan apparatus 20, various modifications can be made without departing from the scope of the present invention. For example, more or less chases could be defined within stand 12 by the provision of internal dividing walls disposed so as to extend between outer wall 30 and inner wall 32 (see FIG. 8). With additional chases, openings disposed at different locations within the stand, and facing either internal to the work chamber or external to the stand, could be employed. For example, reference openings 45 (shown in phantom) adjacent to work surface 16. Further, if additional air supply is required than can be supplied by chases 40a, 40b & 40c through openings 44a, 44b & 44c, additional chases could be formed by appropriate duct work secured to outer wall 30 or inner wall 32 of the stand.

A further significant concept of the present invention is the option to balance air flow within the work chamber so as to achieve a laminar flow. By being able to provide multiple chases facing internal to the work chamber, greater control over air flow dynamics within the chamber is achieved. Additional control enhancements and modifications involving this concept are discussed below.

Figure 4A:
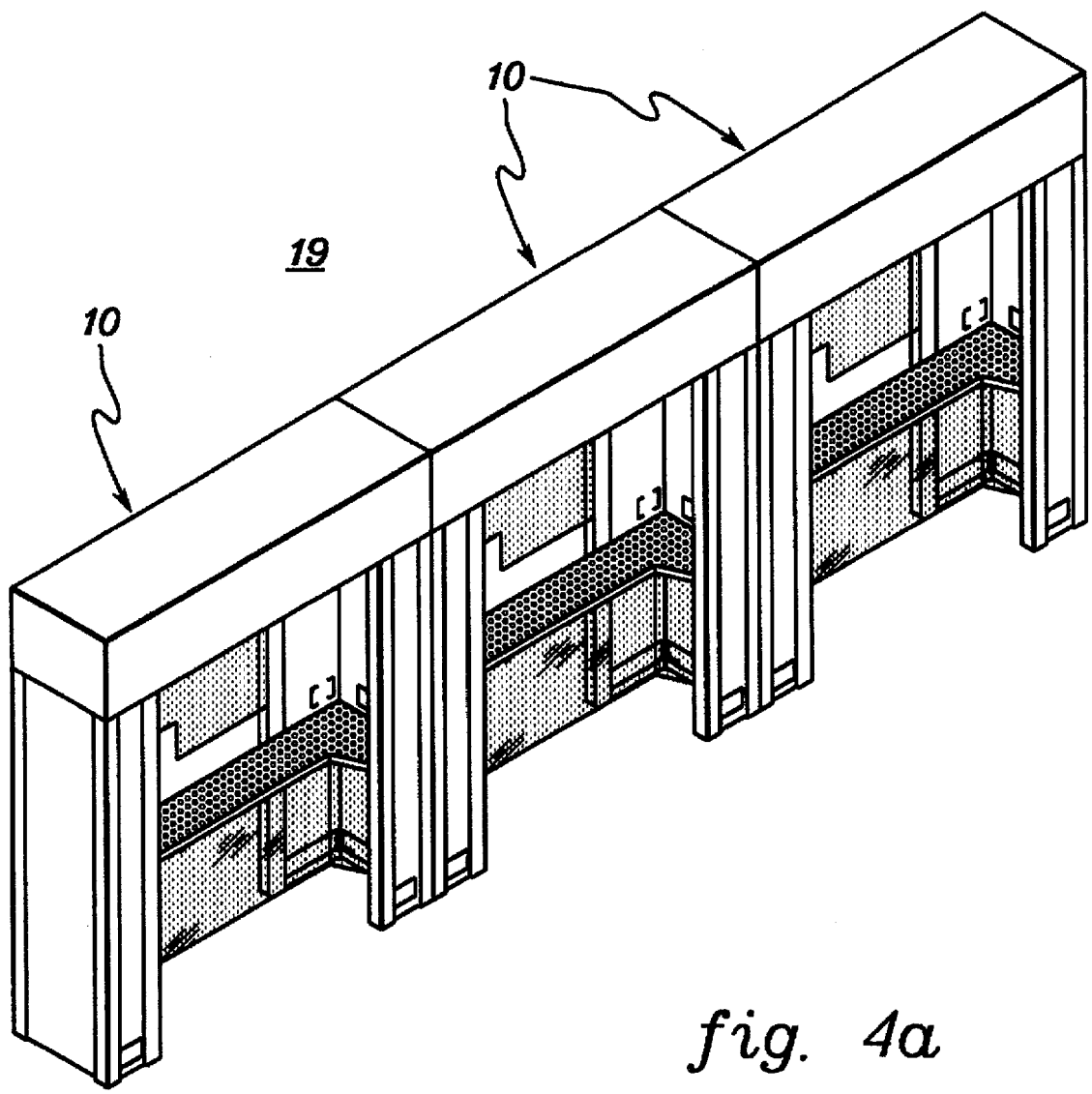
FIG. 4a is a perspective view of multiple environmental enclosure apparatus in accordance with the present invention arranged side-by-side within a clean room.

FIG. 4a depicts one preferred approach to positioning of multiple environment enclosure apparatus 10 within a clean room in accordance with the present invention. As shown, the apparatus are disposed side-by-side either directly contacting each other or, if separated, connected by an air impervious panel such that a clean room isle 11 is defined separate from a core area 19, which would contain the piping and other equipment need to operate the clean room. Greater detail is shown in FIG. 4b, wherein an environmental enclosure apparatus 10 in accordance with the present invention is shown disposed on each side of a clean room aisle 11. Aisle 11 receives conditioned air from conventional HVAC ceiling equipment 13a. This conditioned supply air reaches clean room 11 after passing through duct work 13b and ULPA filters 13c. Air balancing between clean room 11 and core area 19 is achieved principally via provision of a raised floor 15 which allows air flow from the clean room into the core area where returns 17 are typically disposed. Advantageously, apparatus in accordance with the present invention can be used to assist in air flow balancing between the clean room and the core area. For example, air drawn into chases 40a, 40b & 40c could be partially exhausted into the core area at the fan/filter apparatus. This would enhance air balancing in a large clean room to better prevent dead zones of air flow within the room, particularly in the middle of an aisle where returns are located at either end.

Figure 5A:
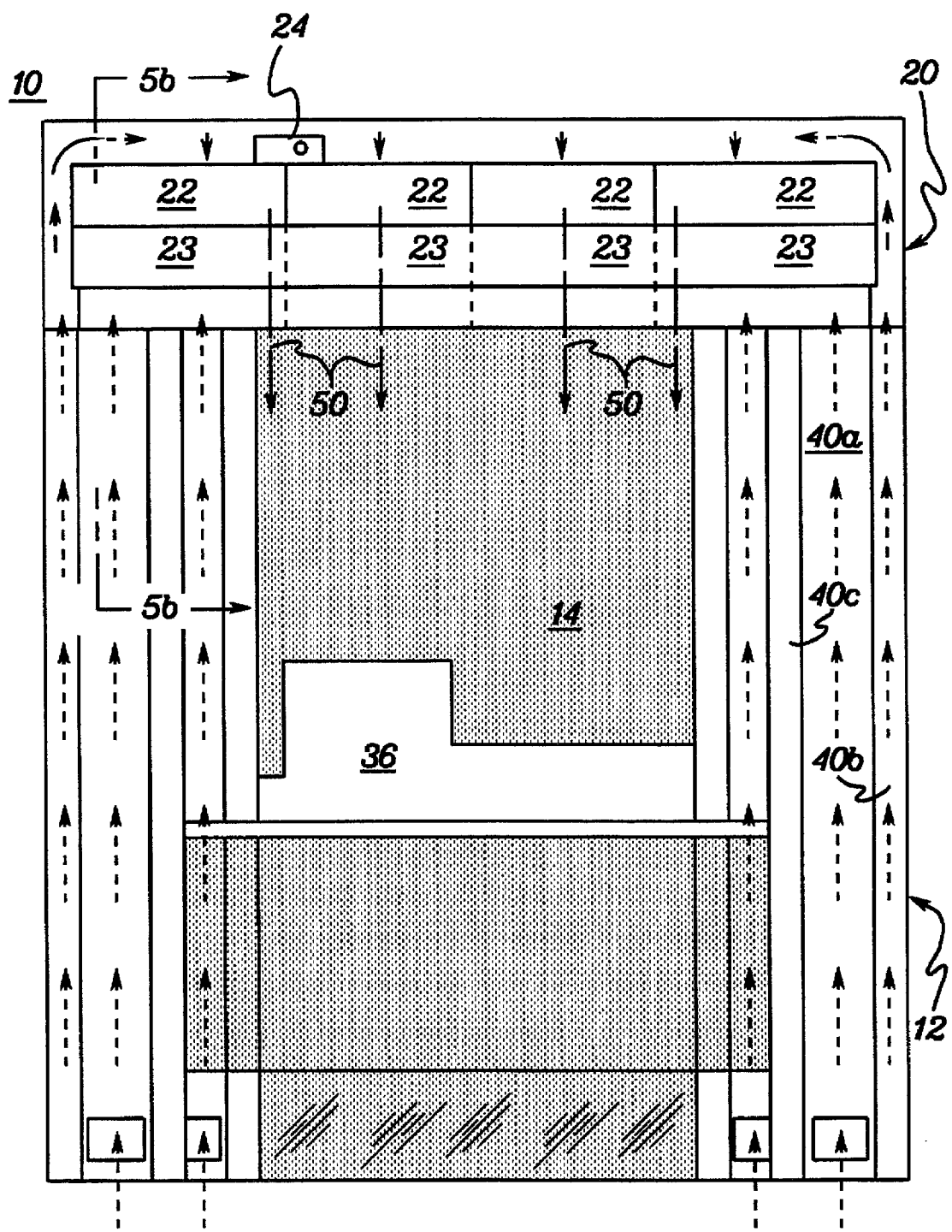
FIG. 5a is a front elevational view of the environmental enclosure apparatus of FIG. 1.

FIG. 5a depicts in greater detail air flow dynamics within environmental enclosure apparatus 10. As shown, supply air from chases 40a, 40b & 40c is provided to fan apparatus 20. Each adjustable fan 22 draws in an amount of air which can be automatically controlled through control mechanism 24. An Ulpa filter 23 is associated with each adjustable fan 22 for filtering particles from air moving into work chamber 14 from that fan. Preferably, the amount of air moving into the work chamber is independently controllable at each fan so that greater air flow may be achieved in selected areas of the chamber, for example, in an area directly over a work tool. As shown, air is moved downwardly into the chamber from apparatus 20, however, directionally adjustable fans are also possible.

Figure 5B:
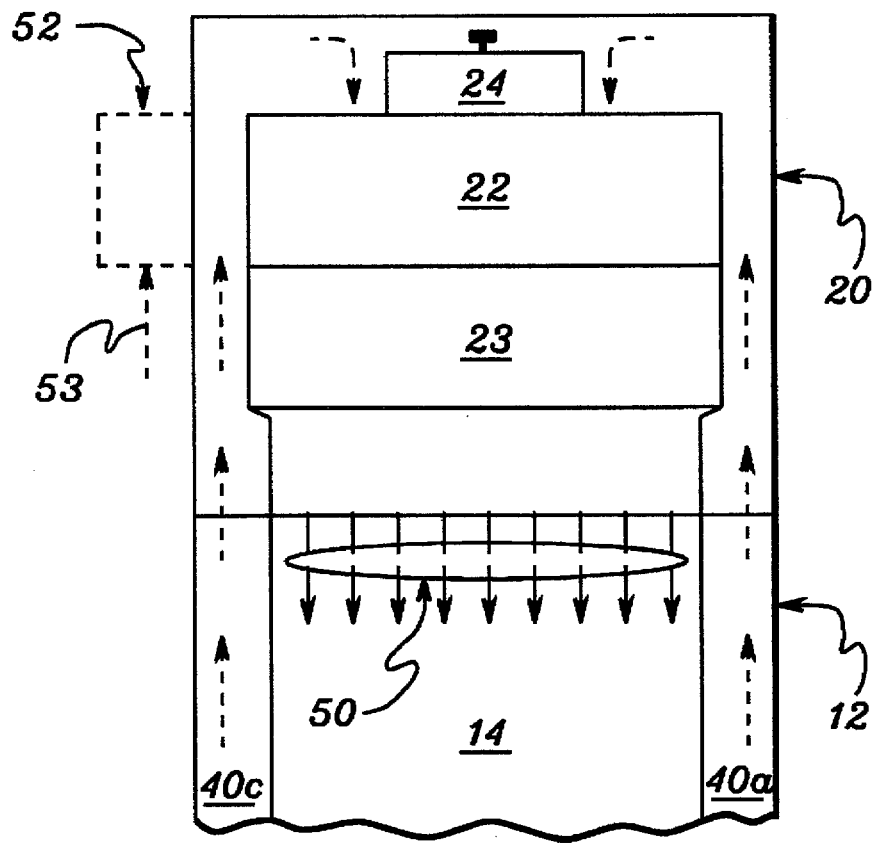
FIG. 5b is a partial cross-sectional view of the environmental enclosure apparatus of FIG. 5a taken along lines 5b—5b.

In the partial cross-section of FIG. 5b, supply air is moving upward within chases 40a and 40c to fan apparatus 20 where the air is drawn by adjustable fans 22, passed through filters 23 and then provided to work chamber 14, e.g., as a laminar flow 50 from front to back of the work chamber. If desired, fan apparatus 20 could include one or more auxiliary inlets 52 for drawing in additional air 53 proximate to fans 22 to ensure prompt response to a call for increased air flow into work chamber 14 at one (or more) selected area of the work chamber. Since this air is drawn from the back of environmental enclosure apparatus 10, then in a clean room environment such as depicted in FIGS. 4a & 4b, air 53 would comprise unconditioned air and its use is preferably limited.

Figure 6:
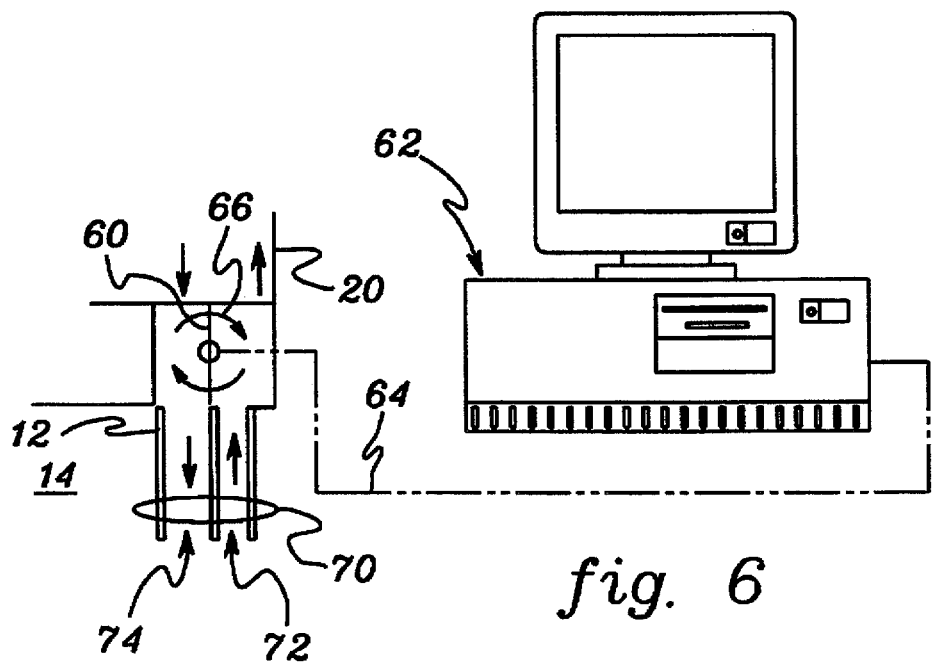
FIG. 6 is an electromechanical diagram depicting a two-way damper control in accordance with the present invention.

FIG. 6 depicts one embodiment of a controllable damper 60 disposed within the environmental enclosure apparatus at the interface between stand 12 and fan apparatus 20. This damper is controlled by computer 62 via an appropriate control line 64. In the embodiment shown, there is assumed to be two chases 72 & 74 in the wall structure 70 comprising stand 12. Chase 72 consists of a supply air chase for fan apparatus 20, while chase 74 is shown to comprise a duct for moving filtered air downward for provision to the work chamber. For example, chase 74 could have an outlet 45 as shown in phantom in FIG. 2 such that air can be moved from the fan/filter apparatus 20 directly to an area adjacent to work surface 16 (see FIG. 2). Various modifications to this basic concept can be employed. For example, each chase 72, 74 may have its own damper, which may be manually or, more preferably, computer controlled. As another variation, both inlets and outlets could be provided adjacent to the work surface for removing and providing air, respectively, at different areas of the chamber adjacent to the work surface. Again, the goal of the present invention is to be able to establish through the various control mechanisms a laminar flow within the workstation. The positioning of inward facing openings, such as openings 45 (FIG. 2) can be important to maintaining straight path air flow within chamber 14. This would ensure a greatest amount of total air change within the chamber, as well as prevent dead zones and limit air turbulence.

Figure 7:
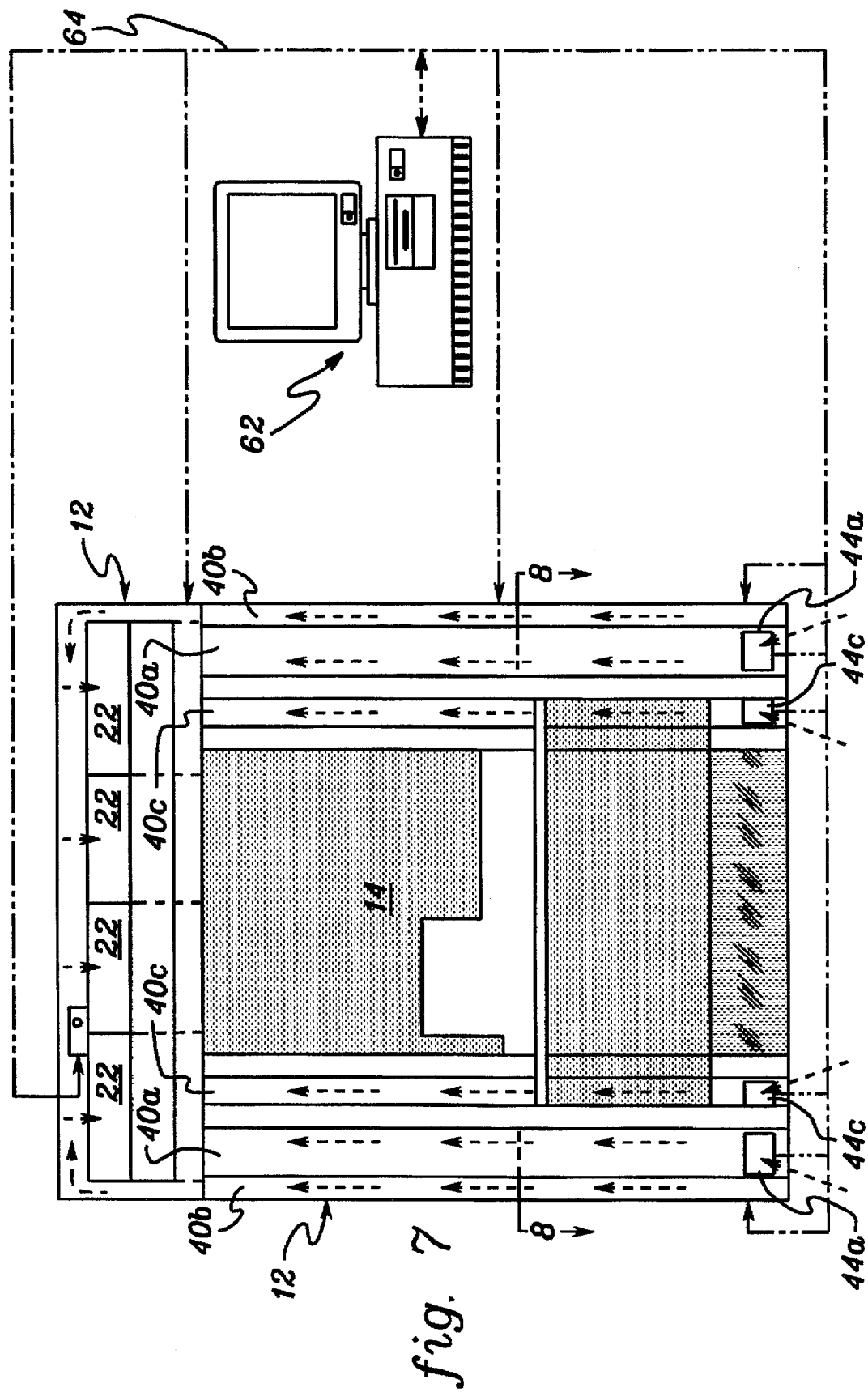
FIG. 7 is a front elevational view of the environmental enclosure apparatus with damper control in accordance with the present invention.

Computer controllable dampers are assumed to be added to main chases 40a, 40b & 40c in FIG. 7. Thus, appropriate control wiring 64 is provided to each controllable damper. In accordance with this invention, computer 62 might receive feedback on pressure within work chamber 14 and pressure within the clean room where the apparatus resides. With detection of a change in the pressure differential, computer 62 could correspondingly adjust the amount of air being drawn from the surrounding clean room through openings 44a or the amount of supply air drawn from the chamber itself through openings 44b and 44c. These computer controlled dampers may be used in combination with the computer control of the adjustable fans 22. Further control may be obtained by employing controllable dampers within any chases providing air flow into chamber 14 in the vicinity of the work surface as discussed above in connection with FIG. 6.

Figure 8:
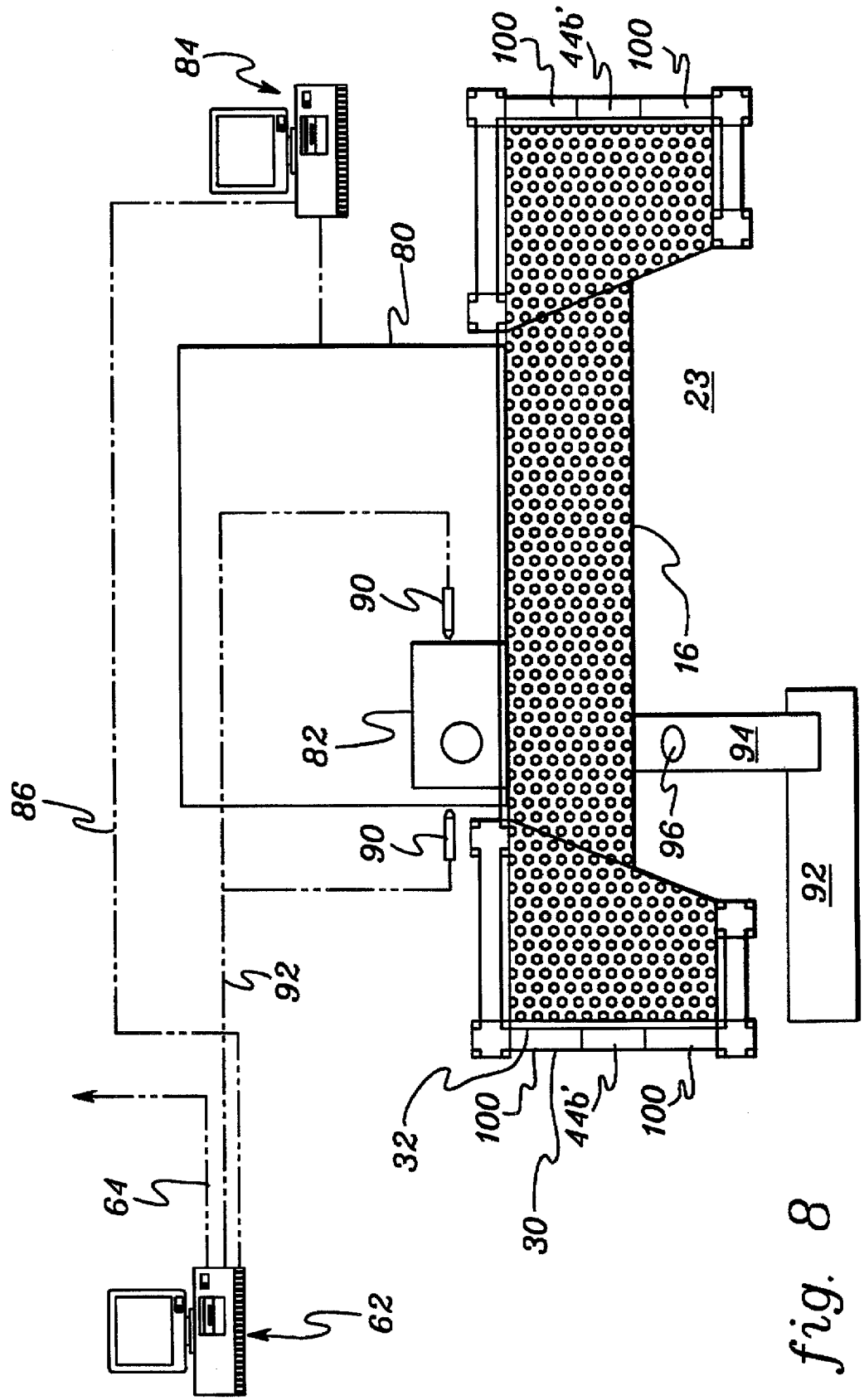
FIG. 8 is a cross-sectional view of the environmental enclosure apparatus of FIG. 7 taken along lines 8—8, wherein a control mechanism for a work tool to be used in combination with the environmental enclosure apparatus is depicted.

FIG. 8 depicts a cross-sectional view of the environmental enclosure apparatus 10 showing one embodiment of a work tool 82 disposed within its housing 80 at the back portion of stand 12. Work tool 82 is assumed to be positioned adjacent to work surface 16 and have, for example, an arm (not shown) that extends into the work chamber. In accordance with one aspect of the invention, the position of work tool 82 can be sensed, for example, via a sensing means 90, which can be fed back via line 92 to a control computer 62. Computer 62 further includes control of dampers within the environmental enclosure apparatus and/or control of the adjustable fans via line 64. As an alternative, computer 62 could receive signals directly from a work tool controller 84 via line 86. This would ensure almost instantaneous adjustment of air flow within the work chamber in response to movement of the work tool.

As noted above, a material handling device 92 could also be used at access opening 23 to the apparatus. Device 92 includes an arm 94 which extends into the chamber for manipulating work product 96, such as a semiconductor wafer. As a detailed example, the material handling device 92 could comprise a robotic manipulator designed to automatically transfer wafers between different environmental enclosure apparatus within the clean room.

FIG. 8 also depicts another embodiment for providing chases within stand 12 between an inner wall and an outer wall. In this embodiment each side wall has defined therein three chases, 44b' & 100. Chases 44b' might comprise supply chases, while chases 100 could similarly comprise supply chases only with their inlets disposed adjacent to the work surface. Alternatively, these chases could comprise delivery chases for providing air flow directly to an area adjacent to the work surface. Those skilled in the art will understand that numerous additional variations to this basic concept are possible. Again, a principal goal of this invention is to provide efficient air balancing and clean room conditions within the work chamber, while simultaneously conserving energy.

Those skilled in the art should note from the above description that the environmental enclosure apparatus in accordance with the present invention achieves energy efficient air flow control, in part by employing clean room supply air which has already been conditioned. The apparatus can be used to attain or assist in air flow balancing between the clean room and the environmental enclosure apparatus, between the enclosure and a core area, between the clean room and the core area, and between adjacent enclosures. Further, the apparatus provides automatic air flow control in response to movement of a work component within the enclosure. Energy efficiency is enhanced by selectively increasing/decreasing fluid flow in target areas of the work chamber in response to a change within the work chamber, such as the existence of an undesired pressure differential between the work chamber and the ambient environment or movement of a work tool within the chamber.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. An environmental enclosure apparatus comprising:

a housing having a work chamber;

a fan apparatus for moving gaseous fluid into the work chamber, said fan apparatus comprising multiple adjustable fans;

a filter for filtering particulate from gaseous fluid moving into the work chamber;

sensing means for sensing a change within said work chamber, said change comprising repositioning of a work component within said work chamber;

control means coupled to said sensing means and to said multiple adjustable fans, said control means causing an automatic adjustment in at least one adjustable fan of said multiple fans in response to said sensing means sensing said change within the work chamber; and wherein said work component comprises a work tool and said sensing means further comprises means for sensing movement of the work tool within said work chamber, and wherein said control means responds to movement of the work tool within the work chamber by automatically varying gaseous fluid flow through the at least one adjustable fan of said multiple adjustable fans.

2. The environmental enclosure apparatus of claim 1, wherein each adjustable fan of said multiple adjustable fans is independently controllable by said control means for varying its moving of gaseous fluid into the work chamber.

3. The environmental enclosure apparatus of claim 2, wherein each adjustable fan of said multiple adjustable fans directs gaseous fluid into a different area of the work chamber.

4. The environmental enclosure apparatus of claim 1, wherein said sensing means comprises at least one motion detector within said work chamber, and wherein said control means includes means for varying the gaseous fluid flow through the at least one adjustable fan, said at least one adjustable fan being directed to a current position of the work tool within the work chamber.

5. The environmental enclosure apparatus of claim 4, wherein said fan apparatus is disposed at a top portion of said housing and said multiple adjustable fans move gaseous fluid downward into the work chamber.

6. The environmental enclosure apparatus of claim 1, wherein said work component further comprises a work product undergoing processing within said work chamber, and said sensing means comprises means for sensing movement of the work product within said work chamber, and wherein said control means responds to movement of the work product within the work chamber by automatically varying gaseous fluid flow through at least one adjustable fan of said multiple adjustable fans based on a current position of the work product.

7. The environmental enclosure apparatus of claim 6, wherein said sensing means comprises at least one motion detector within said work chamber, and wherein said control means includes means for varying the gaseous fluid flow through the at least one adjustable fan directed to a current position of the work product within the work chamber.

8. The environmental enclosure apparatus of claim 7, wherein said fan apparatus is disposed at a top portion of said housing and said multiple adjustable fans move gaseous fluid downward into the work chamber.

9. The environmental enclosure apparatus of claim 1, wherein said work component further comprises a material handling device and said sensing means further comprises means for sensing movement of the material handling device within the work chamber, and wherein said control means responds to movement of the material handling device within the work chamber by automatically varying gaseous fluid flow through the at least one adjustable fan of the multiple adjustable fans.

10. The environmental enclosure apparatus of claim 9, wherein said sensing means comprises at least one motion detector within the work chamber, and wherein said control means includes means for varying of the gaseous fluid flow through the at least one adjustable fan, said at least one adjustable fan being directed to a current position of the material handling device within the work chamber.

11. An environmental enclosure apparatus comprising:

a housing having a work chamber;

a fan apparatus for moving gaseous fluid into the work chamber, said fan apparatus comprising multiple adjustable fans;

a filter for filtering particulate from gaseous fluid moving into the work chamber;

sensing means for sensing a change within the work chamber, said change comprising repositioning of a work component within said work chamber;

control means coupled to said sensing means and to said multiple adjustable fans said control means causing an automatic adjustment in at least one adjustable fan of said multiple fans in response to said sensing means sensing said change within the work chamber; and further comprising multiple chases within said housing for supplying gaseous fluid to said fan apparatus, at least some of said multiple chases each having a controllable damper, and wherein said control means further includes means for automatically adjusting said controllable dampers of said at least some chases to maintain a desired gaseous fluid condition within the work chamber.

12. The environmental enclosure apparatus of claim 11, wherein said housing includes a work surface, and wherein at least one chase of said at least some chases having said adjustable dampers has an inlet in said work chamber adjacent to said work surface for drawing gaseous fluid therefrom.

13. An environmental enclosure apparatus comprising:

a housing having a work chamber;

a fan apparatus for moving gaseous fluid into the work chamber, said fan apparatus comprising multiple adjustable fans;

a filter for filtering particulate from the gaseous fluid moving into the work chamber;

sensing means for monitoring a pressure difference between pressure within said work chamber and pressure external to the environmental enclosure apparatus, said sensing means including at least one internal pressure sensor within said work chamber and at least one external pressure sensor external to the environmental enclosure apparatus; and control means coupled to said sensing means and to said multiple adjustable fans, said control means causing an automatic adjustment in at least one adjustable fan of said multiple adjustable fans in response to said sensing means sensing a change in the pressure differential between said pressure within the work chamber and said pressure external to the environmental enclosure apparatus.

14. The environmental enclosure apparatus of claim 13, wherein said control means varies gaseous fluid flow through said at least one adjustable fan of said multiple adjustable fans in response to a change in the pressure differential between pressure internal to the work chamber and pressure external to the environmental enclosure apparatus so as to re-establish a desired pressure differential therebetween.

15. The environmental enclosure apparatus of claim 14, wherein said housing includes a service opening to said work chamber, and said change in pressure differential between pressure internal to the work chamber and pressure external to the environmental enclosure apparatus is due to presence of a material handling device at said access opening to said work chamber, said at least one external pressure sensor of said sensing means being disposed adjacent to said access opening to said work chamber.

16. An environmental enclosure apparatus for disposition in a room containing conditioned gaseous fluid, the environmental enclosure apparatus comprising:

a workstation stand having a work chamber defined within the workstation stand;

a fan apparatus for moving gaseous fluid into the work chamber;

a filter for filtering particulate from gaseous fluid moving into the work chamber;

at least one chase for supplying gaseous fluid to the fan apparatus, each chase being disposed within said workstation stand and extending from a lower portion of said workstation stand to an upper portion of said workstation stand;

wherein an inlet to each chase is disposed at said lower portion of said workstation stand and positioned within said workstation stand for drawing in said conditioned gaseous fluid from the room for supply to said fan apparatus; and wherein said environmental enclosure apparatus is sized to reside within said room containing said conditioned gaseous fluid.

17. The environmental enclosure apparatus of claim 16, wherein the room comprises a first space, and wherein the environmental enclosure apparatus is sized to partially separate the first space and a second space, said second space containing unconditioned gaseous fluid.

18. The environmental enclosure apparatus of claim 16, wherein said workstation stand includes a front wall containing a service opening into said work chamber, and wherein said at least one chase is disposed within said front wall.

19. The environmental enclosure apparatus of claim 17, wherein said at least one chase comprises a plurality of chases within said workstation stand for supplying gaseous fluid to said fan apparatus, each chase having an inlet disposed in a wall of the workstation stand adjacent to a bottom of said workstation stand and an outlet in the upper portion of said workstation stand at said fan apparatus.

20. The environmental enclosure apparatus of claim 19, wherein the inlets of at least some chases of said plurality of chases face inward to the work chamber, and wherein said front wall includes a lower opening in a lower portion thereof to allow conditioned gaseous fluid from said room to reach the inlets of said at least some chases, and wherein said workstation stand includes a work surface, said lower opening being disposed beneath said work surface.

21. The environmental enclosure apparatus of claim 19, wherein said workstation stand has an inner wall and an outer wall, and wherein said plurality of chases are defined between said inner wall and said outer wall of said workstation stand, and wherein said work chamber is defined at least partially by said inner wall of said workstation stand.

22. The environmental enclosure apparatus of claim 19, wherein said fan apparatus is disposed at an upper portion of said workstation stand and moves said gaseous fluid downward into the work chamber.

23. The environmental enclosure apparatus of claim 22, wherein said environmental enclosure apparatus comprises a workstation for processing semiconductor wafers, said room comprises a clean room area and said second space comprises a core area, and wherein said workstation stand includes a work surface disposed within said work chamber, said work surface including holes to allow said gaseous fluid to pass therethrough, and wherein at least some chases of said plurality of chases at least partially draw gaseous fluid from within said work chamber.

24. The environment enclosure apparatus of claim 16, further comprising at least one balance chase disposed within the workstation stand with an inlet disposed for drawing gaseous fluid from the work chamber of the workstation stand for supply to the fan apparatus.

25. The environmental enclosure apparatus of claim 24, wherein said workstation stand includes a work surface, and wherein the inlet to the at least one balance chase is disposed adjacent to said work surface.

26. The environmental enclosure apparatus of claim 20, wherein the inlet of at least one chase of said plurality of chases faces outward from the workstation stand into said room containing said conditioned gaseous fluid.

27. An environmental enclosure apparatus comprising:

a housing having a work chamber and a work surface within said work chamber;

a fan apparatus for moving gaseous fluid into the work chamber;

a filter for filtering particulate from gaseous fluid moving into the work chamber;

multiple chases within the housing each having an inlet disposed within said work chamber adjacent to said work surface and an outlet at said fan apparatus, wherein said inlets to said multiple chases are disposed within said work chamber adjacent to said work surface to balance fluid flow within the work chamber to ensure a substantially uniform fluid flow within the work chamber.

28. An environmental enclosure apparatus comprising:

a housing having a work chamber and a work surface within said work chamber;

a fan apparatus for moving gaseous fluid into the work chamber;

a filter for filtering particulate from gaseous fluid moving into the work chamber;

multiple chases within the housing each having an inlet disposed within said work chamber adjacent to said work surface and an outlet at said fan apparatus, wherein said inlets to said multiple chases are disposed within said work chamber adjacent to said work surface to balance fluid flow within the work chamber to ensure a substantially uniform fluid flow within the work chamber; and wherein said fan apparatus includes multiple adjustable fans, and wherein said environmental enclosure apparatus further comprises:

sensing means for sensing pressure at multiple locations within the work chamber; and control means coupled to the sensing means and to the multiple adjustable fans, said control means automatically varying said adjustable fans in response to an imbalance in pressure within said work chamber sensed by said sensing means.

29. An environmental enclosure apparatus comprising:

a housing having a work chamber and a work surface within said work chamber;

a fan apparatus for moving gaseous fluid into the work chamber;

a filter for filtering particulate from gaseous fluid moving into the work chamber;

multiple chases within the housing each having an inlet disposed within said work chamber adjacent to said work surface and an outlet at said fan apparatus, wherein said inlets to said multiple chases are disposed within said work chamber adjacent to said work surface to balance fluid flow within the work chamber to ensure a substantially uniform fluid flow within the work chamber; and wherein each chase of said multiple chases has an adjustable draw means associated therewith for adjusting drawing of gaseous fluid from the work chamber through said chase, and wherein said environmental enclosure apparatus further comprises:

sensing means for sensing pressure at multiple locations within said work chamber; and control means coupled to the sensing means and to each adjustable draw means, said control means automatically varying the adjustable draw means associated with at least one chase of said multiple chases in response to said sensing means sensing a pressure imbalance within the work chamber.

30. The environmental enclosure apparatus of claim 27, wherein said multiple chases draw gaseous fluid from said work chamber, and wherein said environmental enclosure apparatus further comprises at least one supply chase, said at least one supply chase being disposed within the housing and supplying gaseous fluid from said fan apparatus to said work chamber, said supply chase having an outlet near said work surface.

31. The environmental enclosure apparatus of claim 30, wherein said at least one supply chase comprises multiple supply chases, each supply chase of said multiple supply chases having an outlet adjacent to said work surface for supply of gaseous fluid from said fan apparatus into said work chamber, and wherein said environmental enclosure apparatus further comprises control means for balancing drawing of gaseous fluid through said multiple chases for supply to said fan apparatus and supply of gaseous fluid from said fan apparatus into said work chamber at least partially through said multiple supply chases.

32. The environmental enclosure apparatus of claim 30, wherein said control means comprises damper means on at least some of said multiple chases and said multiple supply chases for control of gaseous fluid flow therethrough.

33. An environmental enclosure apparatus comprising:

a housing having a work chamber;

a fan apparatus for moving gaseous fluid into the work chamber;

a filter for filtering particulate from gaseous fluid moving into the work chamber;

multiple chases for supplying said gaseous fluid to the fan apparatus, said multiple chases being disposed within said housing, each chase of said multiple chases having an inlet positioned to face inward to said work chamber;

adjustable draw means associated with at least one chase of said multiple chases for actively drawing gaseous fluid from said work chamber for supply to said fan apparatus;

sensing means for sensing a pressure change within said work chamber; and control means coupled to the sensing means and to each adjustable draw means, said control means automatically adjusting said adjustable draw means associated with said at least one chase in response to said sensing means sensing said pressure change within the work chamber.

34. The environmental enclosure apparatus of claim 33, wherein said housing includes a work surface in said work chamber, and wherein at least some chases of said multiple chases are disposed with their inlets positioned adjacent to said work surface.

35. The environmental enclosure apparatus of claim 33, wherein said adjustable draw means is associated with each chase of said multiple chases for actively drawing gaseous fluid from said work chamber, and wherein said control means includes means for controlling said adjustable draw means so as to maintain air balancing within said work chamber.

36. The environmental enclosure apparatus of claim 33, wherein said fan apparatus includes at least one adjustable fan, and wherein said control means is coupled to said at least one adjustable fan for varying gaseous fluid flow therethrough in response to a pressure change within said work chamber.

37. The environmental enclosure apparatus of claim 36, wherein said sensing means further comprises means for sensing movement of a work tool within said work chamber, and said control means responds to sensing movement of the work tool by varying gaseous fluid flow through the at least one adjustable fan.

38. An environmental enclosure apparatus comprising:

a housing having a work chamber;

a fan apparatus for moving gaseous fluid into the work chamber, said fan apparatus including at least one adjustable fan;

a filter for filtering particulate from said gaseous fluid moving into the work chamber;

at least one chase within said housing for supplying gaseous fluid to said fan apparatus, said at least one chase including an adjustable damper and having an inlet within said work chamber;

sensing means for sensing gaseous fluid pressure within the work chamber; and control means, coupled to the at least one adjustable fan, the adjustable damper of the at least one chase and the sensing means, for balancing gaseous fluid pressure within the work chamber by automatically adjusting said at least one adjustable fan and said adjustable damper of said at least one chase to maintain a desired gaseous fluid pressure balance within the work chamber.

39. The environmental enclosure apparatus of claim 38, wherein said fan apparatus is disposed at an upper portion of said housing and moves said gaseous fluid downward into the work chamber, and wherein said inlet to said at least one chase is disposed adjacent to a work surface within said work chamber.

40. The environmental enclosure apparatus of claim 39, further comprising means for actively drawing gaseous fluid from said work chamber through said at least one chase, said means for actively drawing said gaseous fluid being controllable by said control means for balancing gaseous fluid pressure within said work chamber.

41. A method for balancing gaseous fluid pressure within a work chamber of an environmental enclosure apparatus, said method comprising:

(a) employing multiple adjustable fans to move gaseous fluid into the work chamber;

(b) filtering particulate from the gaseous fluid moving into the work chamber;

(c) sensing a change within the work chamber, said change comprising movement of a work tool within the work chamber; and (d) varying, in response to said change within the work chamber, said moving of gaseous fluid into the work chamber by varying fluid flow through said at least one adjustable fan of said multiple adjustable fans being employed in said step (a).

42. The method of claim 41, wherein said change further comprises movement of a work product within the work chamber, and wherein said sensing step (c) comprises sensing said movement of said work product, and said step (d) comprises varying said moving of gaseous fluid into said work chamber in response to said movement of said work product.

43. An environmental enclosure apparatus for disposition in a room containing conditioned gaseous fluid, the environmental enclosure apparatus comprising:

a workstation stand having a work chamber therein, said work chamber including a work surface disposed intermediate an upper portion and a lower portion of the workstation stand;

a fan apparatus for moving gaseous fluid into the work chamber;

a filter for filtering particulate from gaseous fluid moving into the work chamber;

multiple chases for supplying gaseous fluid to the fan apparatus, a first chase of said multiple chases being disposed within said workstation stand to extend from the lower portion of the workstation stand to the upper portion of the workstation stand such that an inlet to said first chase is disposed in said lower portion of the workstation stand to draw in gaseous fluid for supply to said fan apparatus, and wherein a second chase of said multiple chases is disposed with an inlet adjacent to said work surface for drawing gaseous fluid from adjacent said work surface for supply to said fan apparatus; and control means for controlling the amount of gaseous fluid drawn through at least one of said first chase and said second chase, said control means comprising means for facilitating balancing of said gaseous fluid flow within said work chamber.

44. The environmental enclosure apparatus of claim 43, wherein said workstation stand comprises multiple double wall sections, each double wall section being defined by an inner wall and an outer wall, and wherein said first chase and said second chase are disposed within a same double wall section of said multiple double wall sections.

45. The environmental enclosure apparatus of claim 43, wherein the inlet to said first chase is disposed to face outward from said workstation stand to draw in said conditioned gaseous fluid from said room, while the inlet to said second chase is disposed to face inward to the work chamber to draw gaseous fluid from within the work chamber.

46. An environmental enclosure apparatus comprising:

a housing having a work chamber and a work surface within said work chamber;

a fan apparatus for moving gaseous fluid into the work chamber;

a filter for filtering particulate from gaseous fluid moving into the work chamber; and multiple chases within the housing, a first chase of said multiple chases supplying gaseous fluid to the fan apparatus, and a second chase of said multiple chases supplying gaseous fluid from said fan apparatus into said work chamber, said second chase having an outlet adjacent to said work surface.

47. The environmental enclosure apparatus of claim 46, wherein the first chase includes an inlet disposed to face inward to said work chamber so as to draw gaseous fluid from said work chamber.

48. The environmental enclosure apparatus of claim 47, further comprising control means for controlling gaseous fluid flow through at least one of said first chase and said second chase.

* * * * *